US007144143B2

(12) United States Patent
Matsumoto

(10) Patent No.: US 7,144,143 B2
(45) Date of Patent: Dec. 5, 2006

(54) VEHICLE HEADLIGHT

(75) Inventor: Kazuhiro Matsumoto, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 133 days.

(21) Appl. No.: 11/000,502

(22) Filed: Dec. 1, 2004

(65) Prior Publication Data

US 2005/0128765 A1 Jun. 16, 2005

(30) Foreign Application Priority Data

Dec. 1, 2003 (JP) ............................ 2003-402126
Nov. 5, 2004 (JP) ............................ 2004-322666

(51) Int. Cl.
*F21V 7/00* (2006.01)

(52) U.S. Cl. ...................... 362/517; 362/214; 362/215

(58) Field of Classification Search ........ 362/507–508, 362/517–518, 211, 214, 215; 313/115, 113, 313/316, 315, 579
See application file for complete search history.

(56) References Cited

U.S. PATENT DOCUMENTS 5,111,368 A * 5/1992 Suzuki et al. ............... 362/510
6,439,745 B1 * 8/2002 Futami ....................... 362/297
6,630,770 B1 * 10/2003 Okubo ....................... 313/115

FOREIGN PATENT DOCUMENTS

JP 62-163201 A 7/1987
JP 2003-025906 A 1/2003

* cited by examiner

*Primary Examiner*—Ali Alavi
(74) *Attorney, Agent, or Firm*—Foley & Lardner LLP

(57) ABSTRACT

A vehicle headlight includes a first lamp unit and a second lamp unit. The first lamp unit includes a light source and a reflector. The light source includes a first filament, a second filament, and a shade. The reflector includes a first reflection surface, a second reflection surface, and a third reflection surface. The third reflection surface reflects light from the first filament to obtain a first condensing light-distribution-pattern, and reflects light from the second filament to obtain a second condensing light-distribution-pattern.

11 Claims, 5 Drawing Sheets

B
R,I
L,O
F
Z2,Z3
Z1
9
12
11
F1
BP2
BP1
BP2
BP1
21
Z1
Z2,Z3

B
R,I
L,O
F
Z3
20
20
9
12
11
F3
9
23I
SP1
SP2
SP2
SP1
23O
Z3

B
R,I
L,O
F
Z2
9
F2
12
22
SHP
WHP
Z2

VEHICLE HEADLIGHT

CROSS-REFERENCE TO RELATED APPLICATIONS

The present document incorporates by reference the entire contents of Japanese priority document, 2004-322666 filed in Japan on Nov. 5, 2004.

BACKGROUND OF THE INVENTION

1) Field of the Invention

The present invention relates to a four-light-type vehicle headlight including a first lamp unit and a second lamp unit, and more particularly, to a four-light-type vehicle headlight suitable for illuminating a road surface on outer side of a vehicle, when the vehicle makes a right or a left turn at an intersection or a corner, or when the vehicle travels on a curved road, such as an adaptive front-lighting system (AFS). In the specification, "road surface and the like" includes the road surface, and persons (pedestrians, etc.) and objects (other vehicles, traffic signs, buildings, etc.) on the road.

2) Description of the Related Art

A four-light-type vehicle headlight of this type is currently in use (see, for example, Japanese Patent Application Laid-Open Publication No. 2003-25906). The vehicle headlight in the earlier application will be explained first. Reference numerals in parenthesis correspond to those in the Japanese Patent Application Laid-Open Publication No. 2003-25906. A vehicle headlight (1) in the earlier application is a four-light-type vehicle headlight including a first lamp unit (3) and a second lamp unit (4). The first lamp unit (3) has a light source (8) and a reflector (5). The light source (8) has a first filament (15), a second filament (16), and a shade (11). The reflector (5) has a first reflection surface (6) and a second reflection surface (7). The second lamp unit (4) has a light source (10) and a reflector (9).

The action of the vehicle headlight in the earlier application will be explained below. When the first filament (15) of the light source (8) in the first lamp unit (3) is lighted, only a bending light-distribution-pattern (T1) is obtained. When the first filament (15) of the light source (8) in the first lamp unit (3) and the light source (10) in the second lamp unit (4) are lighted at the same time, the bending light-distribution-pattern (T1) and a low-beam light-distribution-pattern (P1) is obtained simultaneously. When the second filament (16) of the light source (8) in the first lamp unit (3) is lighted, bending light-distribution-patterns (T1, T2) and high-beam light-distribution-patterns (P0, P2) can be obtained simultaneously. When the light source (10) in the second lamp unit (4) is lighted, only the low-beam light-distribution-pattern (P1) is obtained.

In the vehicle headlight (1) in the earlier application, since the first lamp unit (3) has the function as a bending lamp and a function as a high-beam lamp, the bending lamp is not necessary, thereby having advantages in that the configuration becomes simple, the production cost is reduced, and an installation space for the bending lamp can be saved. The vehicle headlight (1) in the earlier application, however, has a problem in view of improvement both in the light distribution performance of the bending light-distribution-patterns (T1, T2) and in the light distribution performance of the high-beam light-distribution-patterns (P0, P2).

SUMMARY OF THE INVENTION

It is an object of the present invention to solve at least the above problems in the conventional technology.

A four-light-type vehicle headlight according to one aspect of the present invention includes a first lamp unit and a second lamp unit. The first lamp unit includes a light source; and a reflector that reflects light from the light source in a predetermined light distribution pattern. The light source includes a first filament; a second filament; and a shade that shades a part of light from the first filament. The reflector includes a first reflection surface that reflects the light from the first filament to obtain a first bending light-distribution-pattern, and reflects light from the second filament to obtain a second bending light-distribution-pattern; a second reflection surface that reflects the light from the second filament to obtain a high-beam light-distribution-pattern, in which the light from the first filament is shaded by the shade; and a third reflection surface that reflects the light from the first filament to obtain a first condensing light-distribution-pattern, and reflects the light from the second filament to obtain a second condensing light-distribution-pattern.

The other objects, features, and advantages of the present invention are specifically set forth in or will become apparent from the following detailed description of the invention when read in conjunction with the accompanying drawings.

DETAILED DESCRIPTION

Figure 1:
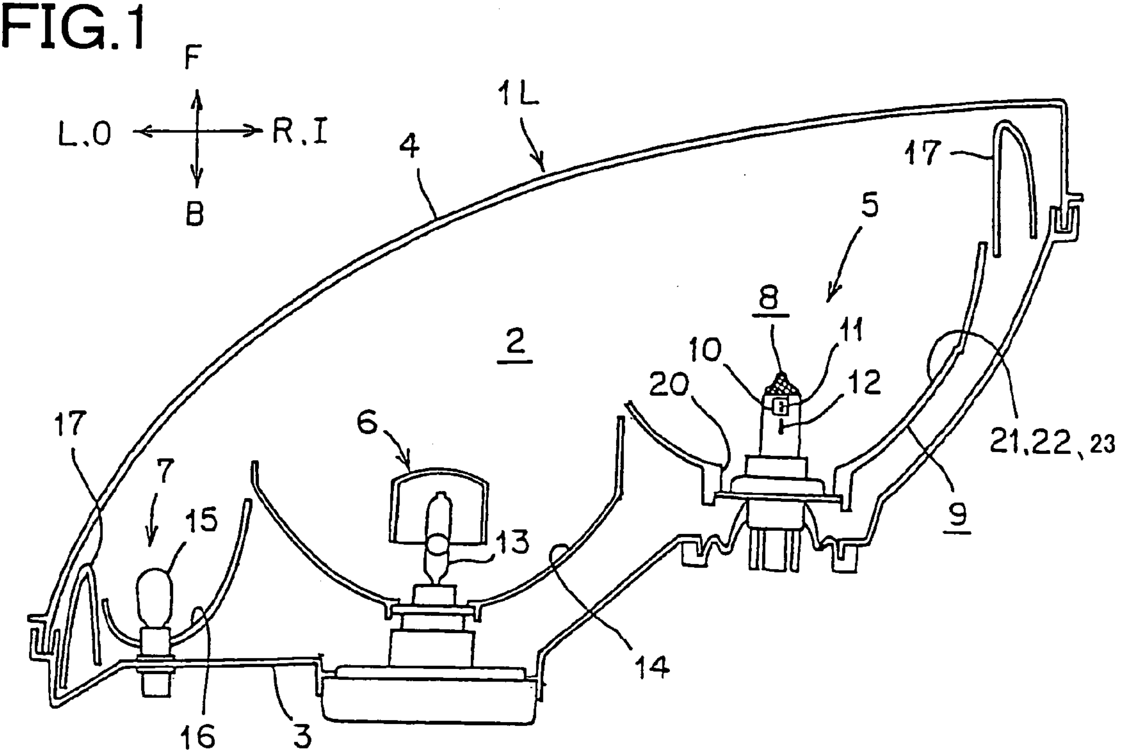
FIG. 1 is a horizontal cross section of a vehicle headlight according to a first embodiment of the present invention, which is a cross section along line I—I in FIG. 3.

Exemplary embodiments of a vehicle headlight according to the present invention will be explained in detail with reference to the accompanying drawings. However, the present invention is not limited to these embodiments. In schematic diagrams shown in FIGS. 1, 5, and 10 to 12, a hatching is omitted.

FIGS. 1 to 9 depict a vehicle headlight according to a first embodiment of the present invention. The configuration of the vehicle headlight in the first embodiment will be explained first. In the drawings, reference sign "F" denotes the front side (traveling direction) of a vehicle C. Reference sign "B" denotes the back side of the vehicle C. Reference sign "I" denotes the inner side of the vehicle C. Reference sign "O" denotes the outer side of the vehicle C. Reference sign "U" denotes upward when a driver sees the front. Reference sign "D" denotes downward when the driver sees the front. Reference sign "L" denotes the left side when the driver sees the front. Reference sign "R" denotes the right side when the driver sees the front. Reference sign "VU-VD" denotes a vertical line on a screen. Reference sign "HL-HR" denotes a horizontal line on the screen.

Figure 2:
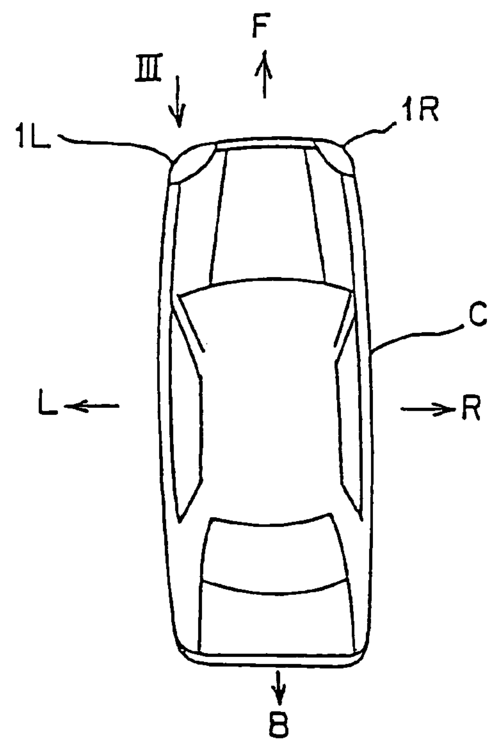
FIG. 2 is a plan view of a vehicle indicating the used condition thereof.
Figure 3:
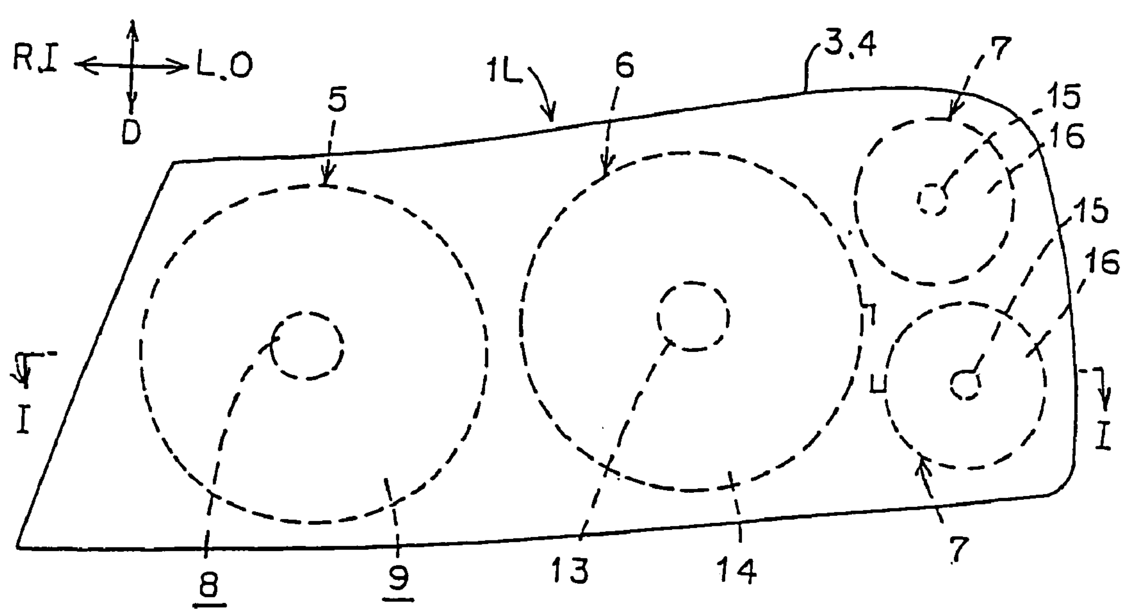
FIG. 3 is a view in the direction of arrow III in FIG. 2.

In FIGS. 1 to 3, reference signs 1L and 1R denote the vehicle headlight (hereinafter, simply "headlight") in the first embodiment. The headlights 1L and 1R are respectively equipped on the left and right sides on the front of the vehicle C. The configuration of the left headlight 1L will be explained below. The configuration of the right headlight 1R is substantially symmetric (reversed from left to right) to the configuration of the left headlight 1L.

The headlight 1L is a four-light headlight, and is a so-called front combination lamp. The headlight 1L includes, as shown in FIGS. 1 and 3, a lamp housing 3 that sections a lamp chamber 2, an outer lens (lamp lens or outer cover) 4, and a first lamp unit 5, a second lamp unit 6, and two supplementary lamp units 7 arranged in the lamp chamber 2.

The outer lens 4 is formed of a transparent or a substantially transparent lens. The horizontal cross section of the outer lens 4 has a slant or a curved shape back and forth from the inner side I to the outer side O of the vehicle C. On the other hand, the first lamp unit 5 is arranged on the inner side I of the vehicle C. The second lamp unit 6 is arranged on the outer side O of the vehicle C. Further, the two supplementary lamp units 7 are arranged on the outer side O of the vehicle C than the second lamp unit 6.

The first lamp unit 5 is a traveling lamp unit, and includes a light source 8 and a reflector 9 that reflects the light from the light source 8 toward the outer lens 4 in a predetermined light distribution pattern.

The light source 8 uses a so-called H4 bulb. That is, as shown in FIG. 1, the light source 8 has a first filament 11 corresponding to a subfilament, a second filament 12 corresponding to a main filament, and a shade 10 that shades a part of light from the first filament 11, that is, light emitted toward a second reflection surface 22.

Figure 4:
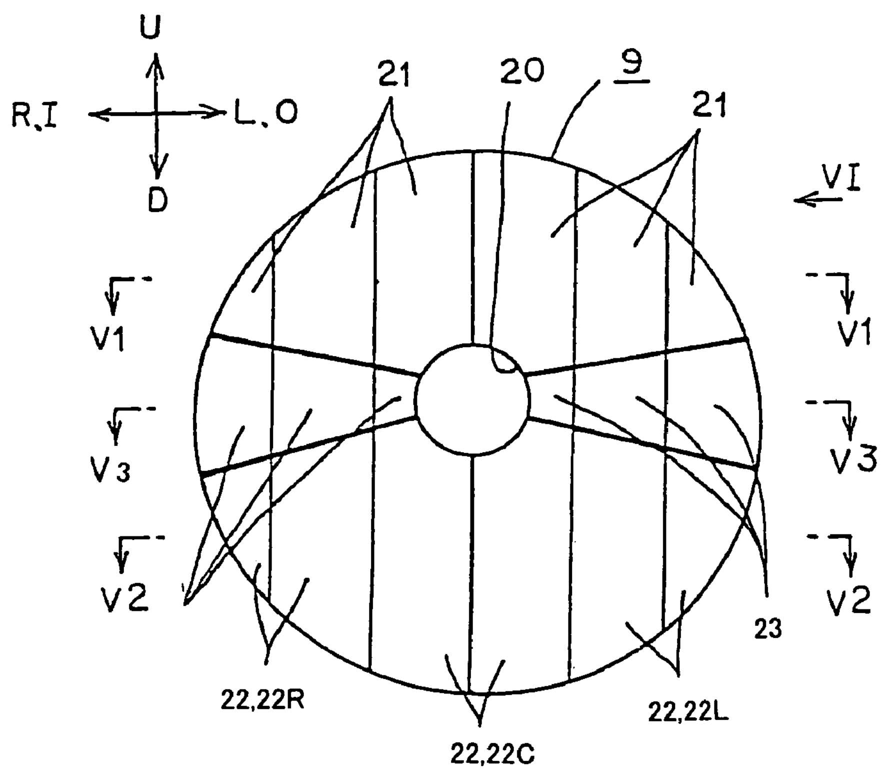
FIG. 4 is a front elevational view of a reflector in a first lamp unit.
Figure 5:
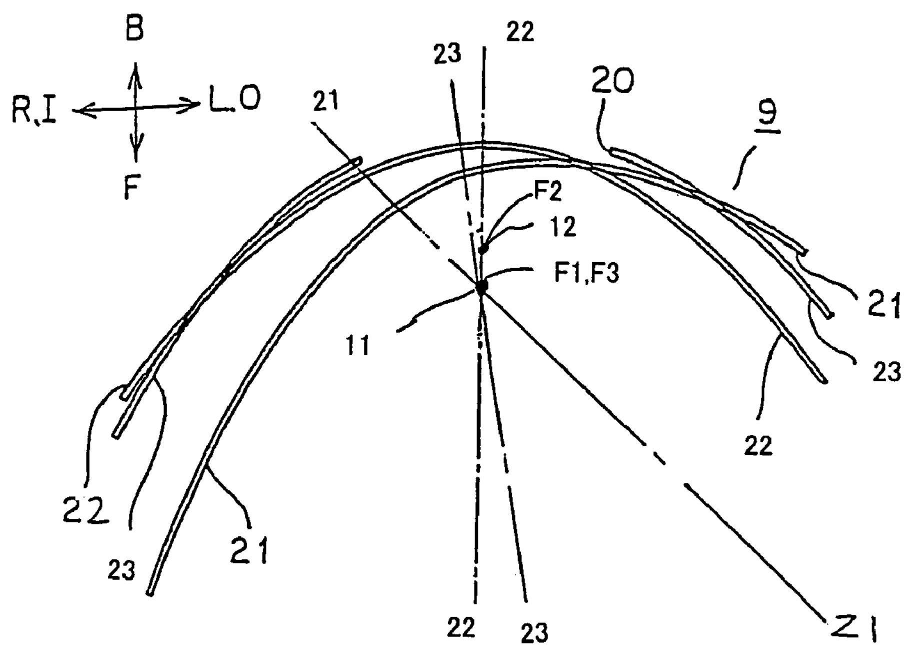
FIG. 5 is a cross section obtained by combining a cross section along line V1—V1, a cross section along line V2—V2, and a cross section along line V3—V3 in FIG. 4.

The reflector 9 has, as shown in FIGS. 4 and 5, a first reflection surface 21, a third reflection surface 23, and the second reflection surface 22 in order from above. That is, the first reflection surface 21 is arranged on the upper side, the second reflection surface is arranged on the lower side, and the third reflection surface is arranged between the first reflection surface and the second reflection surface. A substantially circular through hole 20 is provided substantially at the center of the reflector 9. The through hole 20 is for inserting the light source 8 therethrough. The first reflection surface 21, the second reflection surface 22, and the third reflection surface 23 are divided into a plurality of numbers, respectively, that is, in this embodiment, into six segments horizontally.

Figure 7:
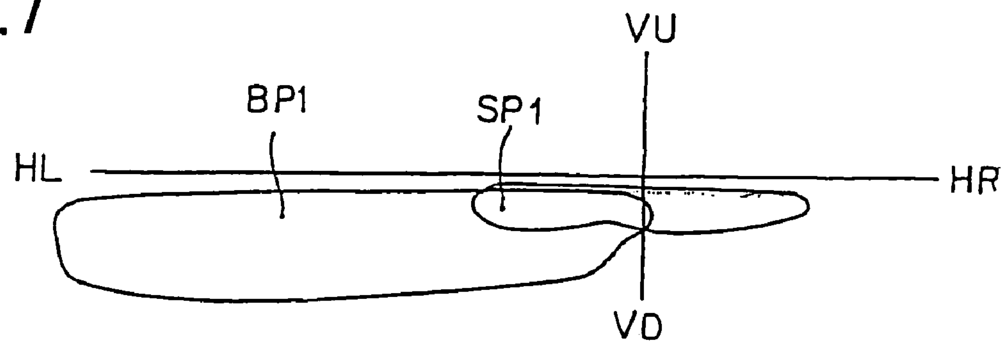
FIG. 7 is an explanatory diagram of a first bending light-distribution-pattern and a first condensing light-distribution-pattern.
Figure 8:
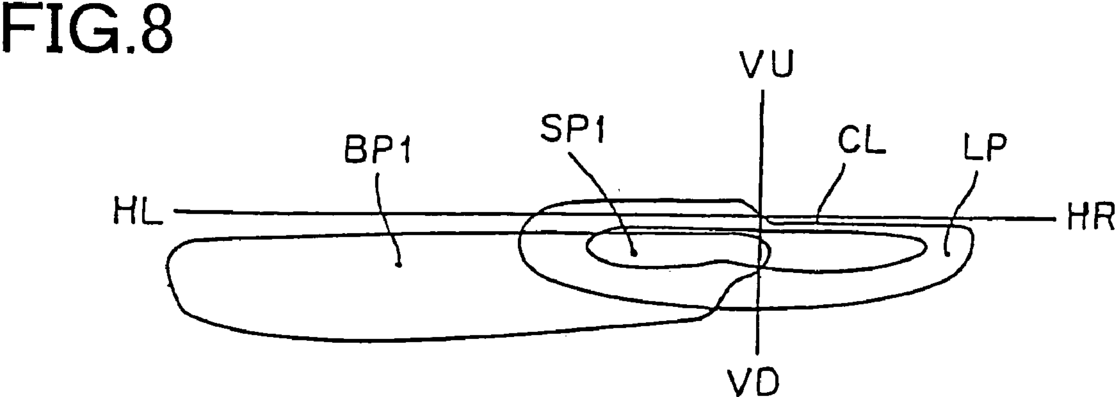
FIG. 8 is an explanatory diagram of the first bending light-distribution-pattern, the first condensing light-distribution-pattern, and a low-beam light-distribution-pattern.

The first reflection surface 21 is designed for light distribution so that a first bending light-distribution-pattern BP1 (see FIGS. 7 and 8) can be obtained by reflecting the light from the first filament 11 of the light source 8. The first bending light-distribution-pattern BP1 is, as shown in FIGS. 7 and 8, largely diffused to the left side from the vertical line VU-VD horizontally, and has a vertically large width downward from the horizontal line HL-HR. In other words, the first bending light-distribution-pattern BP1 is a light distribution pattern such that it extends outward from the center of the vehicle C. Therefore, the first bending light-distribution-pattern BP1 is suitable for widely illuminating the road surface and the like relatively on this side of the outer side O of the vehicle C, when the vehicle C is turning to the right or left at an intersection or at a corner, or traveling a curved road, at a low speed. The first bending light-distribution-pattern BP1 shown in FIGS. 7 and 8 is irradiated by the left headlight 1L. Therefore, the first bending light-distribution-pattern (not shown) irradiated by the right headlight 1R is symmetric (reversed from left to right) to the first bending light-distribution-pattern BP1 shown in FIGS. 7 and 8.

Figure 9:
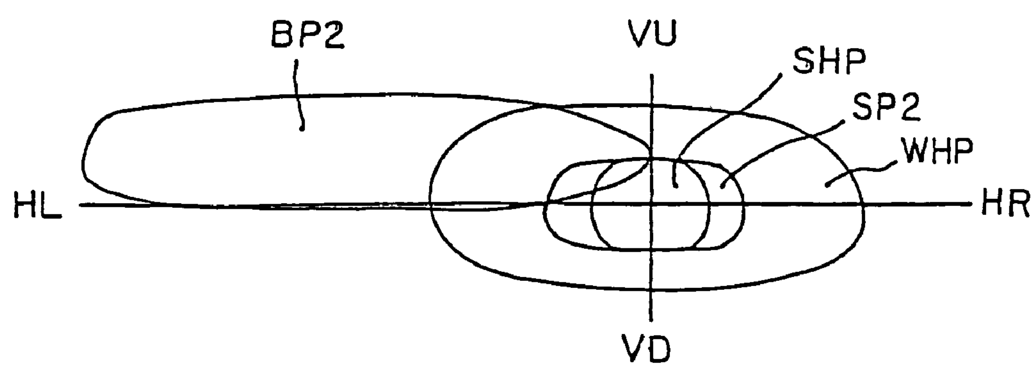
FIG. 9 is an explanatory diagram of a second bending light-distribution-pattern, a second condensing light-distribution-pattern, and a high-beam light-distribution-pattern.

The first reflection surface 21 is designed for light distribution so that a second bending light-distribution-pattern BP2 (see FIG. 9) can be obtained by reflecting the light from the second filament 12 of the light source 8. The second bending light-distribution-pattern BP2 is, as shown in FIG. 9, largely diffused to the left side from the vertical line VU-VD horizontally, and has a vertically large width upward from the horizontal line HL-HR. In other words, the second bending light-distribution-pattern BP2 is a light distribution pattern such that it extends outward from the center of the vehicle C. Therefore, the second bending light-distribution-pattern BP2 is suitable for widely illuminating the road surface and the like relatively on the far side of the outer side O of the vehicle C, when the vehicle C is traveling a curved road at a high speed or traveling at a high speed. The second bending light-distribution-pattern BP2 shown in FIG. 9 is irradiated by the left headlight 1L. Therefore, the second bending light-distribution-pattern (not shown) irradiated by the right headlight 1R is symmetric (reversed from left to right) to the second bending light-distribution-pattern BP2 shown in FIG. 9.

The horizontal cross section of the first reflection surface 21 has, as shown in FIG. 5, a shape opened to the outer side O of the vehicle C. That is, the optical axis Z1—Z1 of the first reflection surface 21 is directed to the outer side O of the vehicle C. As a result, the first reflection surface 21 is most suitable for obtaining the first bending light-distribution-pattern BP1 and the second bending light-distribution-pattern BP2.

Two left side segments 22L and two right side segments 22R of the second reflection surface 22 are designed for light distribution so that a condensing light-distribution-pattern SHP (see FIG. 9) of the high-beam light-distribution-patterns can be obtained by reflecting the light from the second filament 12 of the light source 8. The condensing light-distribution-pattern SHP of the high-beam light-distribution-patterns condenses rays of light, as shown in FIG. 9, vertically and horizontally, designating a point of intersection of the vertical line VU-VD and the horizontal line HL-HR as a substantial center. Therefore, the condensing light-distribution-pattern SHP of the high-beam light-distribution-patterns is suitable for illuminating the vicinity of a point at which the driver is looking, such as the road surface and the like on the front side F (the far side) of the vehicle C, when the vehicle C is traveling a curved road at a high speed or traveling at a high speed. The condensing light-distribution-pattern SHP of the high-beam light-distribution-patterns shown in FIG. 9 is irradiated by the left headlight 1L. Therefore, the condensing light-distribution-pattern SHP (not shown) of the high-beam light-distribution-patterns irradiated by the right headlight 1R has substantially the same shape as (or becomes symmetric to) the condensing light-distribution-pattern SHP of the high-beam light-distribution-patterns shown in FIG. 9.

Two segments 22C at the center of the second reflection surface 22 are designed for light distribution so that the diffused light-distribution-pattern WHP (see FIG. 9) of the high-beam light-distribution-patterns can be obtained by reflecting the light from the second filament 12 of the light source 8. The diffused light-distribution-pattern WHP of the high-beam light-distribution-patterns is diffused widely in the vertical and horizontal directions, designating a point of intersection of the vertical line VU-VD and the horizontal line HL-HR as a substantial center as shown in FIG. 9. Therefore, the diffused light-distribution-pattern WHP of the high-beam light-distribution-patterns is suitable for widely illuminating the road surface and the like on the front side F (the far side) of the vehicle C, when the vehicle C is traveling a curved road at a high speed or traveling at a high speed. The diffused light-distribution-pattern WHP of the high-beam light-distribution-patterns shown in FIG. 9 is irradiated by the left headlight 1L. Therefore, the diffused light-distribution-pattern WHP (not shown) of the high-beam light-distribution-patterns irradiated by the right headlight 1R is substantially the same shape as (or becomes symmetric to) the diffused light-distribution-pattern WHP of the high-beam light-distribution-patterns shown in FIG. 9.

A part of the light from the first filament 11 of the light source 8 is shaded by the shade 10 so it does not enter into the second reflection surface 22. As a result, the light distribution pattern in which the light from the first filament 11 of the light source 8 is reflected by the second reflection surface 22 cannot be obtained.

The horizontal cross section of the second reflection surface 22 has, as shown in FIG. 5, a shape opened to the front side F of the vehicle C. That is, an optical axis Z2—Z2 of the second reflection surface 22 is directed to the front side F of the vehicle C. As a result, the second reflection surface 22 is most suitable for obtaining the condensing light-distribution-pattern SHP and the diffused light-distribution-pattern WHP of the high-beam light-distribution-patterns.

The third reflection surface 23 is designed for light distribution so that a first condensing light-distribution-pattern SP1 (see FIGS. 7 and 8) can be obtained by reflecting the light from the first filament 11 of the light source 8. The first condensing light-distribution-pattern SP1 is, as shown in FIGS. 7 and 8, slightly extended horizontally, designating the vertical line VU-VD as a substantial center, and has a small vertical width downward from the horizontal line HL-HR. Therefore, the first condensing light-distribution-pattern SP1 is suitable for illuminating near a cutline CL of the low-beam light-distribution-pattern LP and the vicinity of a point at which the driver is looking, when the vehicle C is traveling a curved road at a medium speed (40 to 60 km/h). The first condensing light-distribution-pattern SP1 shown in FIGS. 7 and 8 is irradiated by the left headlight 1L. Therefore, the first condensing light-distribution-pattern (not shown) irradiated by the right headlight 1R is substantially the same shape as (or becomes symmetric to) the first condensing light-distribution-pattern SP1 shown in FIGS. 7 and 8. The low-beam light-distribution-pattern LP shown in FIG. 8 is used for when the driving lane is on the left side. Therefore, the low-beam light-distribution-pattern when the driving lane is on the right side is symmetric (reversed from left to right) to the low-beam light-distribution-pattern shown in FIG. 8.

The third reflection surface 23 is designed for light distribution so that a second condensing light-distribution-pattern SP2 (see FIG. 9) can be obtained by reflecting the light from the second filament 12 of the light source 8. The second condensing light-distribution-pattern SP2 is, as shown in FIG. 9, slightly extended vertically and horizontally, designating a point of intersection of the vertical line VU-VD and the horizontal line HL-HR as a substantial center. Therefore, the second condensing light-distribution-pattern SP2 is suitable for illuminating the road surface and the like on the front side F (far side) of the vehicle C, and the vicinity of a point at which the driver is looking, when the vehicle C is traveling a curved road at a high speed or traveling at a high speed. The second condensing light-distribution-pattern SP2 shown in FIG. 9 is irradiated by the left headlight 1L. Therefore, a second bending light-distribution-pattern (not shown) irradiated by the right headlight 1R is substantially the same shape as (or becomes symmetric to) the second condensing light-distribution-pattern SP2 shown in FIG. 9.

Figure 6:
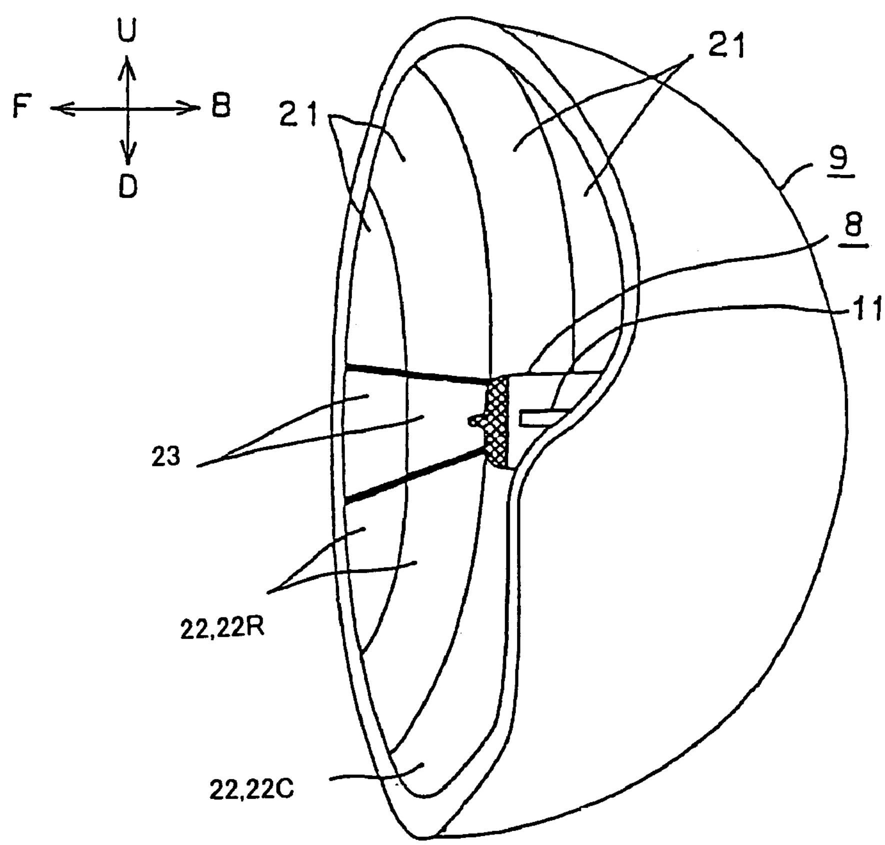
FIG. 6 is a view in the direction of arrow VI in FIG. 4.

The horizontal cross section of the third reflection surface 23 has, as shown in FIG. 5, a shape opened to the front side F and slightly toward the outer side O of the vehicle C. That is, an optical axis Z3—Z3 of the third reflection surface 23 is directed to the front side F and slightly toward the outer side O of the vehicle C. As a result, the third reflection surface 23 is most suitable for obtaining the first condensing light-distribution-pattern SP1 and the second condensing light-distribution-pattern SP2. The focal length of the third reflection surface 23 is larger than that of the first reflection surface 21. As a result, the form of the third reflection surface 23 can be approximated to the form of the first reflection surface 21. In other words, when the reflector 9 in the first lamp unit.5 is seen from the outer side O of the vehicle C, as shown in FIG. 6, the first reflection surface 21 and the second reflection surface 22 are smoothly continuous to each other via the third reflection surface 23.

A focal point F1 of the first reflection surface 21 and a focal point F3 of the third reflection surface 23 are respectively positioned, as shown in FIG. 5, near the first filament 11 of the light source 8. A focal point F2 of the reflection surface 22 is, for example as shown in FIG. 5, positioned near the second filament 12 of the light source 8. The positions of the respective focal points F1, F2, and F3 of the respective reflection surfaces 21, 22, and 23 are not limited to the positions shown in FIG. 5.

The second lamp unit 6 is a low-beam lamp unit, and has a low-beam light source 13 and a low-beam reflector 14 (a low-beam reflection surface) that reflects the light from the low-beam light source 13 toward the outer lens 4 on the front. The second lamp unit 6 is, as shown in FIG. 8, for obtaining a predetermined low-beam light-distribution-pattern LP. For the low-beam light source 13, a single-filament halogen lamp or discharge lamp (a so-called high pressure metal vapor discharge lamp such as a metal halide lamp or a high intensity discharge lamp (HID)) is used.

The supplementary lamp unit 7 is, for example, a front turn signal lamp or a front clearance lamp. The supplementary lamp unit 7 includes a light source 15 and a reflector (reflection surface) 16 that reflects the light from the light source 15 and irradiates the light in a predetermined light distribution pattern. An extension 17 is respectively arranged and secured between the outer lens 4 and the first lamp unit 5, and between the outer lens 4 and the supplementary lamp unit 7. The extension 17 is used for covering so that the structure at the back of the respective lamp units 5, 6, and 7 is not seen.

The first filament 11 and the second filament 12 of the first lamp unit 5, the light source 13 of the second lamp unit 6, and the light source 15 of the supplementary lamp unit 7 are connected to any one of a manual switching device (not shown) and an automatic switching device (not shown) or both via a switching controller (not shown).

The switching controller includes a control circuit and an electrical control unit (ECU), and uses a computer equipped on a vehicle (vehicle). The manual switching device is a lamp switch switched by the driver. The automatic switching device automatically switches the first filament 11 and the second filament 12 of the first lamp unit 5, the light source 13 of the second lamp unit 6, and the light source 15 of the supplementary lamp unit 7 based on environment information around the vehicle C. A device that obtains the environment information around the vehicle C in the automatic switching device includes, for example, an indicator, a speed sensor, a rudder angle sensor, an illuminance sensor, a global positioning system (GPS) receiver, a gyro sensor, a wiper switch, a raindrop sensor, and an imaging device of a semiconductor device, such as a charge coupled device (CCD) camera and a complementary metal oxided semiconductor (CMOS) camera.

The vehicle headlight in the first embodiment has the above configuration, and the action thereof will be explained below.

The first filament 11 of the light source 8 in the first lamp unit 5 is lighted in the left headlight 1L. The light from the first filament 11 is reflected by the first reflection surface 21 and the third reflection surface 23 of the reflector 9. The reflected light is irradiated to the outside as the first bending light-distribution-pattern BP1 and the first condensing light-distribution-pattern SP1 shown in FIG. 7, to illuminate the road surface and the like. When the first filament of the light source in the first lamp unit of the right headlight 1R is lighted, a light distribution pattern symmetric (reversed from left to right) to the first bending light-distribution-pattern BP1 and the first condensing light-distribution-pattern SP1 shown in FIG. 7 can be obtained.

The first filament 11 of the light source 8 in the first lamp unit 5 of the left headlight 1L, and the light source 13 in the second lamp unit 6 of the right and the left headlights 1R and 1L are lighted at the same time. The light from the first filament 11 is reflected by the first reflection surface 21 and the third reflection surface 23 of the reflector 9. At the same time, the light from the light source 13 in the second lamp unit 6 is reflected by the reflector 14. The reflected light is irradiated to the outside as the first bending light-distribution-pattern BP1, the first condensing light-distribution-pattern SP1, and the low-beam light-distribution-pattern LP shown in FIG. 8, to illuminate the road surface and the like. When the first filament of the light source in the first lamp unit of the right headlight 1R is lighted, a light distribution pattern symmetric (reversed from left to right) to the first bending light-distribution-pattern BP1 and the first condensing light-distribution-pattern SP1 shown in FIG. 8 can be obtained, together with the low-beam light-distribution-pattern LP shown in FIG. 8.

In the left headlight 1L, the second filament 12 of the light source 8 in the first lamp unit 5 is lighted. The light from the second filament 12 is reflected by the first reflection surface 21, the second reflection surface 22, and the third reflection surface 23 of the reflector 9. The reflected light is irradiated to the outside as the second bending light-distribution-pattern BP2, the second condensing light-distribution-pattern SP2, and the high-beam light-distribution-patterns SHP and WHP shown in FIG. 9, to illuminate the road surface and the like. When the second filament of the light source in the first lamp unit of the right headlight 1R is lighted, a light distribution pattern symmetric (reversed from left to right) to the second bending light-distribution-pattern BP2, the second condensing light-distribution-pattern SP2, and the high-beam light-distribution-patterns SHP and WHP shown in FIG. 9 can be obtained. When the second filaments 12 of the light sources 8 in the first lamp units 5 of the right and the left headlights 1R and 1L are lighted at the same time, the right and the left second bending light-distribution-patterns BP2, the right and the left second condensing light-distribution-patterns SP2, the high-beam light-distribution-patterns SHP and WHP can be obtained.

When the light sources 13 in the second lamp units 6 of the right and the left headlights 1R and 1L are lighted at the same time, only the low-beam light-distribution-pattern LP shown in FIG. 8 can be obtained. When the light sources 15 in the supplementary lamp units 7 of the right and the left headlights 1R and 1L are lighted at the same time, a predetermined light distribution pattern of the front turn signal lamp, the front clearance lamp, and the like can be obtained.

The vehicle headlight in the first embodiment has the above configuration and action, and the effects thereof will be explained below.

The headlights 1L and 1R in the first embodiment can obtain the first condensing light-distribution-pattern SP1 by reflecting the light from the first filament 11 of the light source 8, and the second condensing light-distribution-pattern SP2 by reflecting the light from the second filament 12 of the light source 8, by the third reflection surface 23. That is, the headlights 1L and 1R in the first embodiment can obtain the first condensing light-distribution-pattern SP1 and the second condensing light-distribution-pattern SP2, which cannot be obtained by the vehicle headlight in the earlier application, by the third reflection surface 23. Therefore, the headlights 1L and 1R in the first embodiment can improve the light distribution performance of the first bending light-distribution-pattern BP1 obtained by the first reflection surface 21, by the first condensing light-distribution-pattern SP1 and the second condensing light-distribution-pattern SP2 obtained by the third reflection surface 23, as well as improving the light distribution performance of the high-beam light-distribution-patterns SHP and WHP obtained by the second reflection surface 22. As a result, the headlights 1L and 1R in the first embodiment can realize improvement both in the light distribution performance of the first bending light-distribution-pattern BP1 and in the light distribution performance of the high-beam light-distribution-patterns SHP and WHP.

Particularly, in the headlights 1L and 1R in the first embodiment, the third reflection surface 23 is arranged between the first reflection surface 21 and the second reflection surface 22, and the focal length of the third reflection surface 23 is larger than that of the first reflection surface 21. Therefore, in the headlights 1L and 1R in the first embodiment, as shown in FIG. 6, the form of the third reflection surface 23 can be approximated to the form of the first reflection surface 21, and hence, the first reflection surface 21 and the second reflection surface 22 are smoothly continuous to each other via the third reflection surface 23. As a result, when the side of the reflector 9 in the first lamp unit 5 is seen from the outer side O of the vehicle C, the headlights 1L and 1R in the first embodiment have no problem in the appearance.

In the headlights 1L and 1R in the first embodiment, the horizontal cross section of the first reflection surface 21 has a shape opened to the outer side O of the vehicle C, the horizontal cross section of the second reflection surface 22 has a shape opened to the front side F of the vehicle C, and the horizontal cross section of the third reflection surface 23 has a shape opened to the front side F and slightly toward the outer side O of the vehicle C, so that the first reflection surface 21 and the second reflection surface 22 are made smoothly continuous to each other. Therefore, the headlights 1L and 1R in the first embodiment can obtain the predetermined light distribution patterns BP1, BP2, SP1, SP2, SHP, and WHP reliably and efficiently. In the headlights 1L and 1R in the first embodiment, further, the direct light from the first filament 11 of the light source 8 passes through the first reflection surface 21 and the edge of the third reflection surface 23 of the reflector 9, and is irradiated to the outer side O of the vehicle C. Accordingly, the visibility at the time of turning to the right or the left at an intersection or at a corner, or traveling on a curved road can be improved. In addition, in the headlights 1L and 1R in the first embodiment, since the first reflection surface 21 and the second reflection surface 22 are smoothly continuous via the third reflection surface 23, the appearance can be further improved.

In the headlights 1L and 1R in the first embodiment, the horizontal cross section of the outer lens 4 has a slant or a curved shape back and forth from the inner side I toward the outer side O of the vehicle C, the first lamp unit 5 is arranged on the inner side I of the vehicle C, and the second lamp unit 6 is arranged on the outer side O of the vehicle C. Therefore, in the headlights 1L and 1R in the first embodiment, the performance of the bending light-distribution-patterns BP1 and BP2 of the first lamp unit 5 can be fully demonstrated, and the light distribution performance of the second lamp unit 6 can be maintained high, while ensuring a shape that does not spoil the design.

In other words, when the arrangement of the first lamp unit 5 is changed to that of the second lamp unit 6, the diffused light emitted from the first lamp unit 5 toward the outer side O of the vehicle C is blocked by the supplementary lamp unit 7, and hence the performance of the bending light-distribution-patterns BP1 and BP2 of the first lamp unit 5 cannot be fully demonstrated. The diffused light from the second lamp unit 6 is also blocked by the headlights 1L and 1R, such as the lamp housing 3, to decrease the light distribution performance. Further, the diffused light from the second lamp unit 6 is shone on the extensions 17 and reflected thereby, and the reflected light causes an optical line or optical unevenness on the road surface and the like, to decrease the commercial value of the headlight. However, the headlights 1L and 1R in the first embodiment do not have such a problem.

When the arrangement of the first lamp unit 5 is changed to that of the supplementary lamp unit 7, the distance between the first lamp unit 5 and the outer lens 4 becomes short, and hence the side of the first lamp unit 5 becomes noticeable, which is not desirable in view of the design. However, the headlights 1L and 1R in the first embodiment do not have such a problem.

Figure 10:
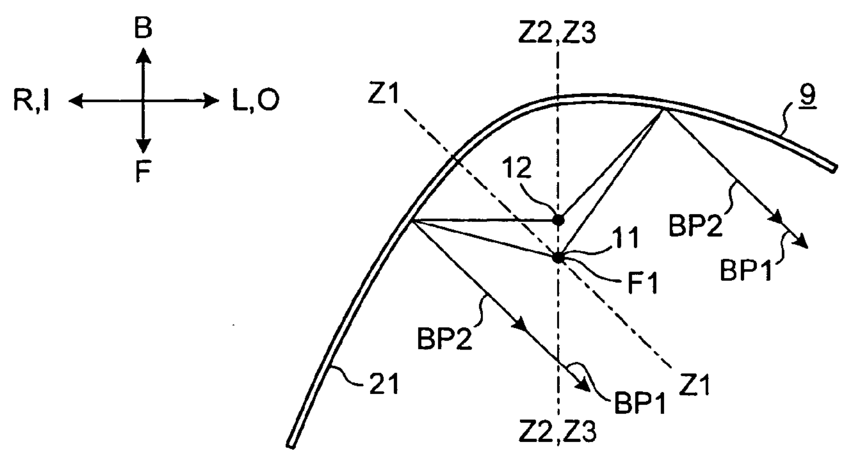
FIG. 10 is a horizontal cross section of a vehicle headlight according a second embodiment of the present invention, which is a cross section along line V1—V1 in FIG. 4.
Figure 11:
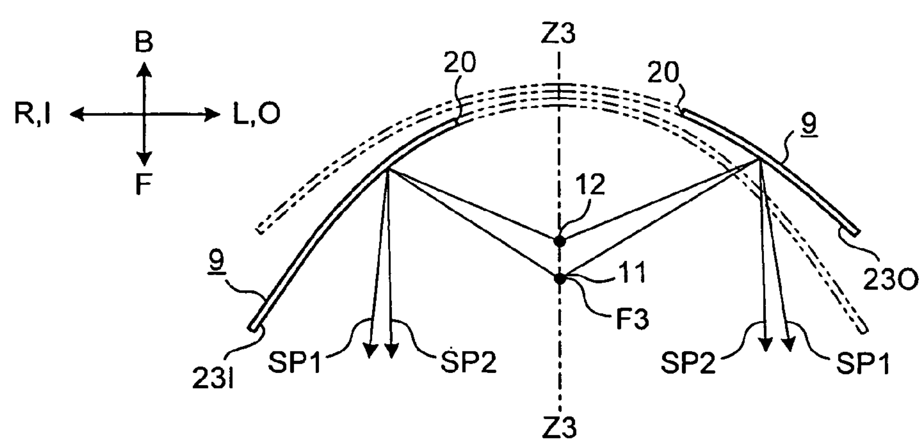
FIG. 11 is a cross section along line V3—V3 in FIG. 4.
Figure 12:
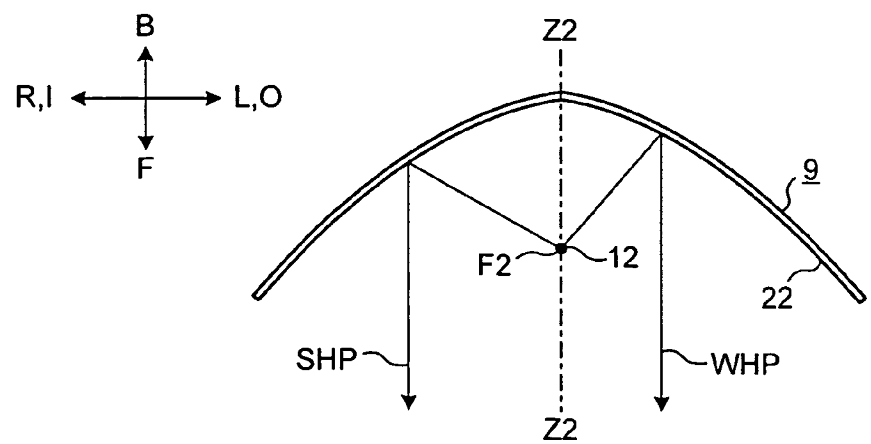
FIG. 12 is a cross section along line V2—V2 in FIG. 4.

FIGS. 10 to 12 respectively depict a vehicle headlight according to a second embodiment of the present invention. The configuration of the vehicle headlight in the second embodiment will be explained below. In these drawings, like reference signs designate to like parts in FIGS. 1 to 9.

In the second embodiment, the horizontal cross section of the first reflection surface 21 has, as shown in FIG. 10, a shape opened to the outer side O of the vehicle C, as in the first embodiment. That is, the optical axis Z1—Z1 of the first reflection surface 21 is directed toward the outer side O of the vehicle C, by appropriately rotating it (for example, in this embodiment, 50 to 60 degrees) in a counterclockwise direction with respect to the optical axis Z2—Z2 of the second reflection surface 22 and the optical axis Z3—Z3 of the third reflection surfaces 23O and 23I, about the focal point F1 of the first reflection surface 21. As a result, the first reflection surface 21 reflects the light from the first filament 11 of the light source 8 to obtain the first bending light-distribution-pattern BP1, and reflects the light from the second filament 12 of the light source 8 to obtain the second bending light-distribution-pattern BP2. The first bending light-distribution-pattern BP1 and the second bending light-distribution-pattern BP2 are light distribution patterns expanding from the center toward the outer side of the vehicle C.

In the second embodiment, as shown in FIG. 12, the horizontal cross section of the second reflection surface 22 has a shape opened to the front side F of the vehicle C, as in the first embodiment. That is, the optical axis Z2—Z2 of the second reflection surface 22 is directed toward the front side F of the vehicle C. As a result, the second reflection surface 22 reflects the light from the second filament 12 of the light source 8 to obtain the condensing light-distribution-pattern SHP and the diffused light-distribution-pattern WHP of the high-beam light-distribution-patterns.

Furthermore, in the second embodiment, the horizontal cross section of the third reflection surfaces 23O and 23I has a shape opened to the front side F of the vehicle C, as shown in FIG. 11. That is, the optical axis Z3—Z3 of the third reflection surfaces 23O and 23I are directed toward the front side F of the vehicle C, substantially agreeing with the optical axis Z2—Z2 of the second reflection surface 22. The third reflection surface is divided into a portion 23O on the outer side of the vehicle and a portion 23I on the inner side of the vehicle. The focal length of the third reflection surface in the portion 23O on the outer side of the vehicle is larger than that of the portion 23I on the inner side of the vehicle. The basic reflection surface of the third reflection surfaces 23O and 23I is first designed, designating the first filament 11 of the light source 8 as the focal point F3, and then a reflection surface of a free-form surface is designed so that the light from the first filament 11 and the light from the second filament 12 of the light source 8 are reflected to obtain the predetermined first condensing light-distribution-pattern SP1 and the second condensing light-distribution-pattern SP2. As a result, the third reflection surfaces 23O and 23I reflect the light from the first filament 11 of the light source 8 to obtain the first condensing light-distribution-pattern SP1 and reflect the light from the second filament 12 of the light source 8 to obtain the second condensing light-distribution-pattern SP2. In the third reflection surface, a point of division between the portion 23O on the outer side of the vehicle and the portion 23I on the inner side of the vehicle is located on a vertical line passing through the optical axis Z3—Z3 of the third reflection surfaces 23O and 23I, although it is not shown in the figure.

The vehicle headlight in the second embodiment can achieve the action and effects similar to those of the vehicle headlight in the first embodiment.

Particularly, in the vehicle headlight in the second embodiment, the focal length of the third reflection surface in the portion 23O on the outer side of the vehicle is larger than that of the portion 23I on the inner side of the vehicle. As a result, the form of the portion 23O on the outer side of the vehicle of the third reflection surface can be approximated to the form of the portion on the outer side O of the vehicle of the first reflection surface 21, while the form of the portion 23I on the inner side of the vehicle of the third reflection surface can be approximated to the form of the portion on the inner side I of the vehicle of the first reflection surface 21. As a result, when the reflector 9 in the first lamp unit 5 is seen from the outer side O of the vehicle C, as shown in FIG. 6, the first reflection surface 21 and the second reflection surface 22 are smoothly continuous to each other via the third reflection surface 23 (23O, 23I).

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A four-light-type vehicle headlight comprising a first lamp unit and a second lamp unit, wherein the first lamp unit includes a light source; and a reflector that reflects light from the light source in a predetermined light distribution pattern, the light source includes a first filament;

a second filament; and a shade that shades a part of light from the first filament, and the reflector includes a first reflection surface that reflects the light from the first filament to obtain a first bending light-distribution-pattern, and reflects light from the second filament to obtain a second bending light-distribution-pattern;

a second reflection surface that reflects the light from the second filament to obtain a high-beam light-distribution-pattern, in which the light from the first filament is shaded by the shade; and a third reflection surface that reflects the light from the first filament to obtain a first condensing light-distribution-pattern, and reflects the light from the second filament to obtain a second condensing light-distribution-pattern.

2. The vehicle headlight according to claim 1, wherein the third reflection surface is arranged between the first reflection surface and the second reflection surface, and a focal length of the third reflection surface is longer than a focal length of the first reflection surface.

3. The vehicle headlight according to claim 1, wherein the first reflection surface is arranged on an upper side, and is divided into a plurality of segments horizontally, the second reflection surface is arranged on a lower side, and is divided into a plurality of segments horizontally, the third reflection surface is arranged between the first reflection surface and the second reflection surface, and is divided into a plurality of segments horizontally, and a focal length of the third reflection surface is longer than a focal length of the first reflection surface.

4. The vehicle headlight according to claim 1, wherein a horizontal cross section of the first reflection surface has a shape opened to an outer side of the vehicle, a horizontal cross section of the second reflection surface has a shape opened to a front side of the vehicle, and a horizontal cross section of the third reflection surface has a shape opened to the front side of the vehicle and slightly toward the outer side of the vehicle.

5. The vehicle headlight according to claim 1, wherein the first reflection surface is arranged on an upper side, and is divided into a plurality of segments horizontally, the second reflection surface is arranged on a lower side, and is divided into a plurality of segments horizontally, the third reflection surface is arranged between the first reflection surface and the second reflection surface, and is divided into a plurality of segments horizontally, a horizontal cross section of the first reflection surface has a shape opened to an outer side of the vehicle, a horizontal cross section of the second reflection surface has a shape opened to a front side of the vehicle, and a horizontal cross section of the third reflection surface has a shape opened to the front side of the vehicle and slightly toward the outer side of the vehicle.

6. The vehicle headlight according to claim 1, wherein the second lamp unit obtains a low-beam light-distribution-pattern, the first lamp unit and the second lamp unit are arranged in a lamp chamber zoned by a lamp housing and an outer lens, the horizontal cross section of the outer lens has a slant or a curved shape back and forth from an inner side toward an outer side of the vehicle, the first lamp unit is arranged on the inner side of the vehicle, and the second lamp unit is arranged on the outer side of the vehicle.

7. The vehicle headlight according to claim 1, wherein the second lamp unit obtains a low-beam light-distribution-pattern and a high-beam light-distribution-pattern in a switchable manner, the first lamp unit and the second lamp unit are arranged in a lamp chamber zoned by a lamp housing and an outer lens, the horizontal cross section of the outer lens has a slant or a curved shape back and forth from an inner side toward an outer side of the vehicle, the first lamp unit is arranged on the inner side of the vehicle, and the second lamp unit is arranged on the outer side of the vehicle.

8. The vehicle headlight according to claim 1, wherein the second reflection surface is divided horizontally into at least three segments, and includes right and left segments that obtain a condensing light-distribution-pattern, and a central segment that obtains a diffused light-distribution-pattern in the high-beam light-distribution-patterns.

9. The vehicle headlight according to claim 1, wherein the first filament and the second filament in the first lamp unit and the light source in the second lamp unit are connected to a manual switching device via a switching controller.

10. The vehicle headlight according to claim 1, wherein the first filament and the second filament in the first lamp unit and the light source in the second lamp unit are connected to an automatic switching device via a switching controller.

11. The vehicle headlight according to claim 1, wherein a horizontal cross section of the first reflection surface has a shape opened to an outer side of the vehicle, a horizontal cross section of the second reflection surface and a horizontal cross section of the third reflection surface have shapes opened to a front side of the vehicle, the third reflection surface is divided into a portion on the outer side of the vehicle and an inner portion of the vehicle, and a focal length of the third reflection surface in the portion on the outer side of the vehicle is longer than a focal length of the third reflection surface in the inner portion of the vehicle.

* * * * *